(12) United States Patent
Alden, III

(10) Patent No.: US 6,786,691 B2
(45) Date of Patent: Sep. 7, 2004

(54) LOAD CELL FOR SECURING ELECTRONIC COMPONENTS

(75) Inventor: Wayne S. Alden, III, Whitman, MA (US)

(73) Assignee: Tyco Electronics Corporation, Middletown, PA (US)

(*) Notice: Subject to any disclaimer, the term of this patent is extended or adjusted under 35 U.S.C. 154(b) by 51 days.

(21) Appl. No.: 10/140,145

(22) Filed: May 7, 2002

(65) Prior Publication Data

US 2003/0210951 A1 Nov. 13, 2003

(51) Int. Cl.[7] .............................................. F16B 21/18
(52) U.S. Cl. .................................... 411/371.2; 411/352
(58) Field of Search ........................... 411/371.1, 371.2, 411/149, 150, 155, 156, 352, 353, 544, 970, 999, 371, 372

(56) References Cited

U.S. PATENT DOCUMENTS

| | | | | |
|---|---|---|---|---|
| 3,465,803 A | * | 9/1969 | Ernest et al. | 411/349 |
| 5,209,018 A | * | 5/1993 | Heinrich | 49/449 |
| 5,336,028 A | * | 8/1994 | Yamamoto | 411/107 |
| 5,603,595 A | * | 2/1997 | Nygren, Jr. | 411/14.5 |
| 5,743,692 A | * | 4/1998 | Schwarz | 411/353 |
| 5,851,095 A | * | 12/1998 | Ellis et al. | 411/353 |
| 6,164,980 A | | 12/2000 | Goodwin | |
| 6,196,849 B1 | | 3/2001 | Goodwin | |
| 6,280,131 B1 | * | 8/2001 | Ellis et al. | 411/353 |
| 6,468,011 B2 | * | 10/2002 | Mayer | 411/353 |
| 6,468,012 B2 | * | 10/2002 | Ellis et al. | 411/353 |
| 6,644,903 B1 | * | 11/2003 | Arand | 411/352 |
| 6,666,640 B1 | * | 12/2003 | Hsieh | 411/508 |
| 6,679,712 B2 | * | 1/2004 | Chang | 439/248 |

* cited by examiner

Primary Examiner—Thomas B. Will
Assistant Examiner—Nathan S Mammen

(57) ABSTRACT

A load cell is provided for interconnecting first to second structures with a desired amount of force. The load cell includes a screw that has a body. The body includes a threaded portion along a first end and a head at a second end opposite the first end. The load cell includes a spring received over the body. The spring has first and second ends opposite one another and is configured to exert a desired amount of force when compressed. The load cell includes a spring retention member that has an opening therethrough receiving the body of the screw. The spring retention member includes a bushing secured to at least one of the spring and the body and a washer that extends outward from the bushing. The first and second ends of the spring press against the washer and the head respectively.

28 Claims, 3 Drawing Sheets

LOAD CELL FOR SECURING ELECTRONIC COMPONENTS

BACKGROUND OF THE INVENTION

Certain embodiments of the present invention generally relate to a screw for securing surfaces together. More particularly, certain embodiments of the present invention relate to a load cell that secures a heat sink to electronic components.

Many electronic components with electrical contacts mating with each other are used in applications in which controlled load forces press against the electronic components. Typically the electronic components are secured to other components, such as a heat sink, by a fastening device that delivers a load force against the electronic component and the heat sink that facilitates mating between contacts. If too much load force is applied to the electronic components, the components may fracture. However, if too little load force is applied to the electronic components, the electrical contacts may form a weak electrical connection. In order to deliver an appropriate load force, a load cell is used to secure an electronic component to a heat sink.

A typical load cell for use with electronic components is described in U.S. Pat. No. 6,196,849 and No. 6,164,980 issued to Goodwin. The load cells of the '849 and '980 patents include a shoulder screw, a compression spring, and a washer. The screw includes a screw head, a shaft, a threaded body, and a barb. The barb extends circumferentially around the shaft under the head of the screw. At least one turn of the spring is positioned between the screw head and the barb with the spring suspended along the shaft and the threaded body of the screw. Connectable electronic components such as a bolster plate, electronic socket, and a heat sink all have threaded apertures that are aligned with each other, so the threaded body of the screw may be inserted into the aligned threaded apertures and secure the electronic components to each other. The washer is unattached to the load cell and may be positioned on the shaft below the spring when the threaded body of the screw is rotatably inserted into the threaded apertures. The spring is compressed as the threaded body is rotatably inserted, and the washer prevents the compressed spring from damaging component surfaces. The spring size and screw length correspond to each other in such a way that, when the spring is fully compressed, a fixed length of the threaded body is inside, and secures, the electronic components as the spring applies a controlled load along the load cell to the electronic components.

The typical load cell suffers from a number of drawbacks. First, the load cell utilizes a standard washer that has a large tolerance. The larger the tolerance for a washer, the greater the compression of the spring relative to the length of the screw. Hence, large washer tolerances cause a range of large loads to be applied to electronic components that may damage such components.

Secondly, securing electronic components to each other with the load cell is time consuming and difficult. The washer is first placed around the threaded aperture on the heat sink surface, and then the screw is rotatably inserted into the threaded aperture until the spring is compressed between the screw head and the washer. This two-step process is further complicated when the heat sink includes a standoff and/or fins situated around the threaded aperture.

Thus a need exists for a load cell that is easy to install and that provides better loading control.

BRIEF SUMMARY OF THE INVENTION

Certain embodiments provide a load cell for securing a first structure to a second structure with a desired amount of force. The load cell includes a screw that has a body with a threaded portion along a first end and a head along a second end opposed to the first end. The load cell also includes a spring that is received over the body, having a first end and a second end opposite one another configured to exert a desired amount of force when the spring is compressed. The load cell further includes a spring retention member. The spring retention member includes an opening therethrough that receives the body of the screw. The spring retention member has a bushing secured to at least one of the spring and the body and a washer extending outward from the bushing. The first end and the second end of the spring press against the washer and the head, respectively.

Certain embodiments provide a load cell for threadably joining a heat sink to a second structure with a desired amount of force. The load cell includes a screw that has a body with a threaded portion along a first end and a head along a second end opposed to the first end. The load cell also includes a spring that is received over the body, having a first end and a second end opposite one another configured to exert a desired amount of force when the spring is compressed. The load cell further includes a spring retention member. The spring retention member includes an opening therethrough that receives the body of the screw. The spring retention member has a bushing secured to at least one of the spring and the body and a washer extending outward from the bushing. The first end and the second end of the spring press against the washer and the head, respectively. The load cell also includes a heat sink that has a base and heat dissipating fins. The base includes threaded openings therethrough that are configured to secure the heat sink to an electronic component.

BRIEF DESCRIPTION OF SEVERAL VIEWS OF THE DRAWINGS

FIG. 3 illustrates a side sectional view of the load cell of FIG. 1 fully inserted into the top surface of the heat sink of FIG. 2.

The foregoing summary, as well as the following detailed description of certain embodiments of the present invention, will be better understood when read in conjunction with the appended drawings. It should be understood, however, that the present invention is not limited to the arrangements and instrumentality shown in the attached drawings.

DETAILED DESCRIPTION OF THE INVENTION

Figure 1:
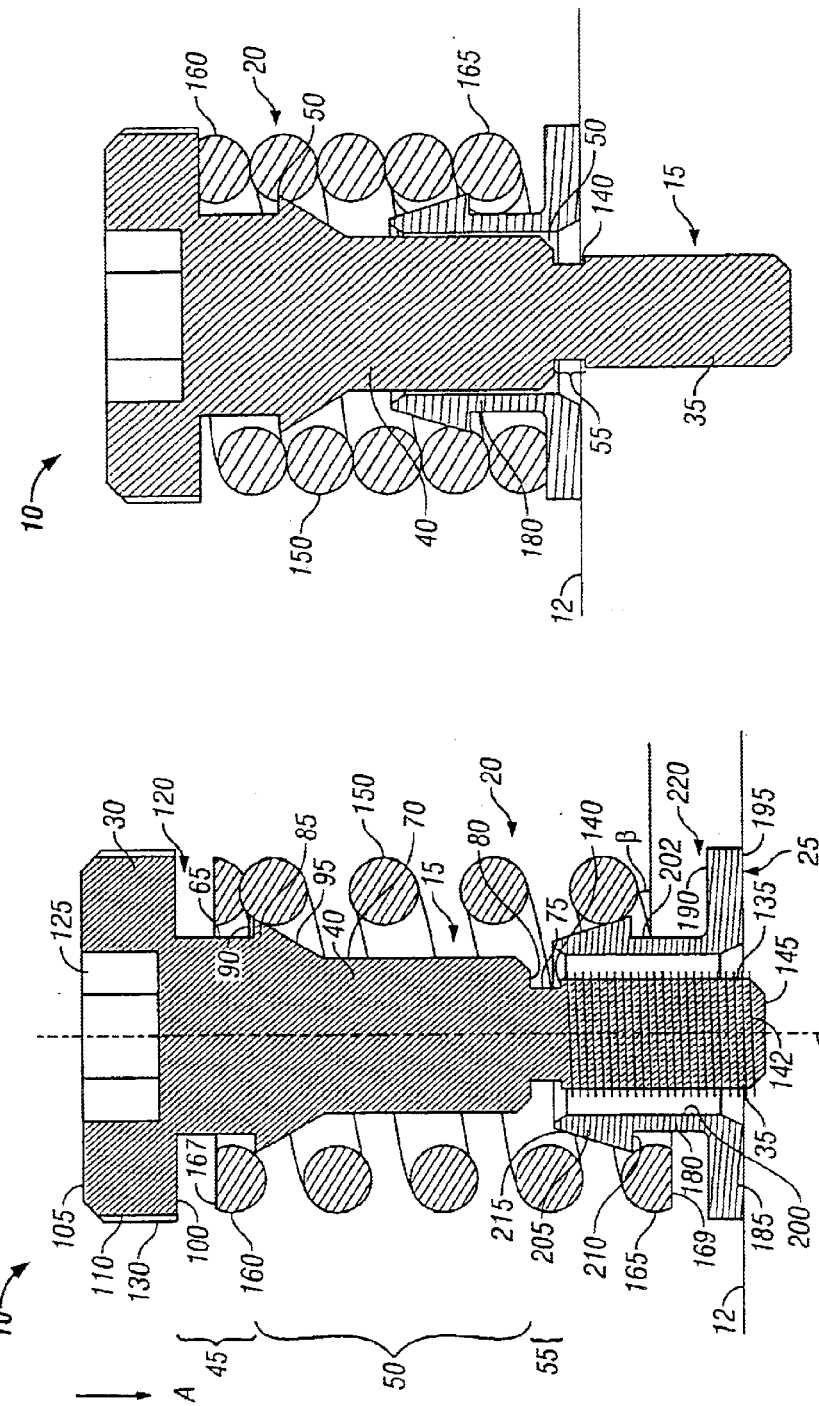
FIG. 1 illustrates a side sectional view of a load cell formed in accordance with an embodiment of the present invention.
Figure 2:
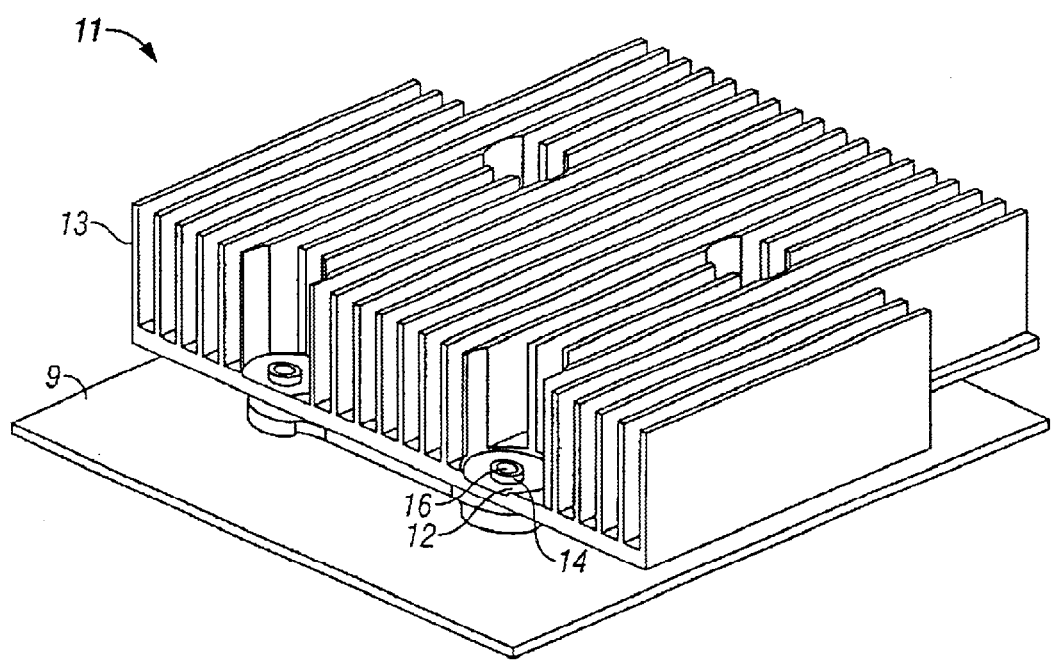
FIG. 2 illustrates an isometric view of a heat sink formed in accordance with an embodiment of the present invention.

FIG. 1 illustrates a side sectional view of a load cell 10 formed in accordance with an embodiment of the present invention. FIG. 2 illustrates an isometric view of a heat sink 11 formed in accordance with an embodiment of the present invention. The load cell 10 is positioned for insertion into the heat sink 11 to secure the heat sink 11 to an electronic component 9. The load cell 10 includes a screw 15, a spring 20, and a spring retention member 25. The heat sink 11 includes a top surface 12, heat release fins 13, standoffs 14, and threaded apertures 16. Some of the standoffs 14 and threaded apertures 16 are completely surrounded by the heat release fins 13. The rectangular heat release fins 13 are formed integrally with, and extend perpendicularly upward from, the top surface 12 of the heat sink 11.

The heat release fins 13 are parallel to each other and direct heat that escapes from the electronic component 9 outward and away from the heat sink 11. The cylindrical standoffs 14 are formed integrally with, and extend upward from, the top surface 12 and encircle the threaded apertures 16. The standoffs 14 receive and are encircled by the spring retention members 25 to secure the spring retention members 25 around the threaded apertures 16. The threaded apertures 16 threadably receive and retain the screw 15 of the load cell 10. The threaded apertures 16 are situated above similar threaded apertures (not shown) of the electronic component 9, so the heat sink 11 may be secured to the electronic component 9 by the load cell 10.

The screw 15 is aligned along a longitudinal axis 17 and includes a disk-shaped head 30, mounted to a generally cylindrical shoulder 40 which is mounted to a threaded portion 35. The head 30 and the threaded portion 35 are formed integrally with the shoulder 40. The shoulder 40 includes a spring capture section 45 that joins a body section 50 that joins a recessed lower rim 55. The spring capture section 45 extends above the body section 50, and the recessed lower rim 55 extends below the body section 50. The spring capture section 45, the body section 50, and the recessed lower rim section 55 include first, second, and third walls 65, 70, and 75, respectively. The first wall 65 has a diameter that is greater than a diameter of the second wall 70, and the diameter of the second wall 70 is greater than a diameter of the third wall 75. The spring 20 encircles the spring capture section 45, the body section 50, and the recessed lower rim section 55. The body section 50 includes a flat, ring shaped bottom surface 80 that perpendicularly intersects the third wall 75. The bottom surface 80 resists any further rotational progress of the screw 15 into the threaded aperture 16 upon contact of the bottom surface 80 with the standoffs 14.

The body section 50 includes a triangular retention barb 85 that is formed integrally with, and extends out circumferentially from, the second wall 70 and that has an outer diameter greater than the diameter of the first wall 65. The retention barb 85 includes a flat ring-shaped top surface 90 that extends perpendicularly from the first wall 65. The top surface 90 retains a portion of the spring 20, and thus holds the spring 20 along the shoulder 40. The retention barb 85 also includes a sloped bottom surface 95 that extends at an acute upward angle from the second wall 70 and intersects the top surface 90. The sloped bottom surface 95 pushes the spring 20 outward and away from the shoulder 40 so the spring 20 assumes a barrel shape and therefore may be more easily compressed.

The head 30 extends above the spring capture section 45 of the shoulder 40. The head 30 includes a ring shaped bottom surface 100, a circular top surface 105, and a cylindrical side wall 110. The bottom surface 100 is perpendicular to the first wall 65 and parallel to the top surface 105. The side wall 110 extends circumferentially outward beyond the first wall 65. The bottom surface 100 forms a first retention gap 120 with the first wall 65 and the top surface 90 of the retention barb 85. A portion of the spring 20 is retained in the first retention gap 120, suspending the spring 20 along the shoulder 40. As the screw 15 is tightened into the standoff 14, the bottom surface 100 engages and resists the portion of the spring 20 retained in the first retention gap 120, compressing the spring 20 in the direction of arrow A against the heat sink surface 12. The top surface 105 includes a tool cavity 125 that is aligned along the longitudinal axis 17 and that extends downward from the top surface 105 toward the spring capture section 45. The tool cavity 125 is shaped to correspond to, and receive, a head of a rotational insertion tool such as a screwdriver (not shown). The sidewall 110 includes vertical rectangular grip ridges 130 that are formed with, and extend out from, the side wall 110 and that are aligned concentrically along the side wall 110. The grip ridges 130 frictionally engage the fingers or gripping tools of an operator touching the head 30, so the operator may better retain and position the screw 15.

The threaded portion 35 extends below the recessed lower rim section 55 of the shoulder 40. The spring retention member 25 and a portion of the spring 20 encircle the threaded portion 35. The threaded portion 35 includes a cylindrical wall 135, a flat, ring-shaped top surface 140, and a chamfered circular bottom portion 145. The wall 135 includes threads 142 that encircle the wall 135 and correspond to the threaded apertures 16 in the heat sink 11. When the bottom portion 145 is positioned into one of the threaded apertures 16 and the load cell 10 is rotated downward onto the heat sink 11, the wall 135 threadably engages the threaded aperture 16 retaining the threaded portion 35 in the threaded aperture 16. Thus, the threaded portion 35 secures the heat sink 11 to the electronic component 9. The load cell 10 is prevented from being positioned too deeply into the heat sink 11 and electronic component 9 when the bottom surface 80 contacts a resisting surface on the threaded aperture 16. The top surface 140 perpendicularly extends from the third wall 75 of the shoulder 40. When the load cell 10 is fully screwed into the threaded aperture 16, the top surface 140 is positioned proximate the top surface 12 of the heat sink 11.

The spring 20 is cylindrical and aligned along the longitudinal axis 17. The spring 20 encircles the shoulder 40 and threaded portion 35 of the screw 15 and a bushing 180 of the spring retention member 25. The spring 20 includes flexible, cylindrically shaped turns 150 that are parallel to each other. The turns 150 wrap circularly upward along the shoulder 40 in a clockwise direction at an angle B to a horizontal plane 155. The turns 150 include a top turn 160 and bottom turn 165. The top turn 160 includes a flat top side 167 and the bottom turn 165 includes a flat bottom side 169. As the screw 15 is rotatably inserted into the threaded aperture 16, the top side 167 engages the bottom surface 100 of the head 30 and the bottom side 169 engages the spring retention member 25, compressing the spring 20. The top and bottom sides 167 and 169 are horizontally flat, therefore, the top and bottom sides 167 and 169 directly engage the head 30 and the spring retention member 25, respectively, and the load exerted by the compressed spring 20 is delivered in a generally vertical, and thus more controlled, vector along the load cell 10. The spring 20 is fully compressed when the bottom surface 80 is pressed against the standoff 14. The compressed spring 20 resists further insertion by the threaded portion 35 and applies a controlled load along the load cell 10 to the heat sink 11 and the electronic component 9. The controlled load presses electrical contacts (not shown) located in the electronic component 9 into mating contact with each other.

The top and bottom turns 160 and 165 both have a spring end diameter. The spring 20 has a middle diameter located equidistant between the top turn 160 and the bottom turn 165. The middle diameter is larger than the spring end diameter so the spring 20 has a barrel shape. The smaller spring end diameter prevents the top turn 160 and bottom turn 165 from sliding off of the shoulder 40 and the spring retention member 25, respectively. The barrel shape allows for the other turns 150 to freely travel vertically along the shoulder 40 as the spring 20 is compressed. With the turns 150 freely travel, the spring 20 may be further compressed so the screw 15 may be rotatably inserted further into the heat sink 11 for a more controlled load.

The spring retention member 25 is aligned along the longitudinal axis 17 and encircles the threaded portion 35. The spring retention member 25 includes the tube shaped bushing 180 and a thin ring-shaped washer 185. The bushing 180 has a first end and an opposite second end and is positioned between the threaded portion 35 and the spring 20. The washer 185 is formed integrally with, and extends circumferentially outward from, the first end of the bushing 180. The washer 185 includes a ring-shaped top surface 190 and bottom surface 195. When the screw 15 is rotatably inserted into the standoff 14, the washer 185 encircles the washer standoff 14, the top surface 190 engages and resists the bottom turn 165, and the bottom surface 195 engages and presses against the top surface 12 of the heat sink 11. The washer 185 has a small tolerance, so the washer 185 has limited interference with the load produced by the spring 20, allowing the load cell 10 to deliver a more controlled load to the heat sink 11 and electronic component 9.

The bushing 180 includes a cylindrical interior wall 200 and a cylindrical exterior wall 202. The interior wall 200 has a diameter that is slightly larger than the diameter of the second wall 70 of the shoulder 40, so the bushing 180 may receive and encircle the body section 50 as the screw 15 is rotatably inserted into the standoff 14. The exterior wall 202 includes a triangular retention barb 205 that is formed integrally with, and extends circumferentially outward from, the second end of the bushing 180. The triangular retention barb 205 includes a flat, ring shaped bottom surface 210 that extends perpendicularly from the exterior wall 202. The bottom surface 210 forms a second retention gap 220 with the exterior wall 202 and the top surface 190 of the washer 185. The triangular retention barb 205 retains the bottom turn 165 of the spring 20 in the second retention gap 220, and thus holds the spring retention member 25 upon the screw 15. The triangular retention barb 205 also includes a sloped top surface 215 that extends at an acute angle from the exterior wall 202 and intersects the bottom surface 210. The sloped top surface 215 pushes the spring 20 outward and away from the spring retention member 25 so the spring 20 assumes a barrel shape.

FIG. 3 illustrates a side sectional view of the load cell 10 of FIG. 1 fully inserted onto the top surface 12 of the heat sink 11 (FIG. 2). The spring 20 is compressed. The bushing 180 encircles the body section 50 and recessed lower rim section 55 of the screw 15 and the top surface 140 of the threaded portion 35 is positioned proximate the top surface 12 of the heat sink 11. The height of the shoulder 40, the size of the spring 20, and the small tolerance of the washer 185 all correspond to each other in such a way that, when the spring 20 is compressed, the threaded portion 35 may not be rotatably inserted any further into the standoff 14, and the load cell 10 exerts a controlled load on the heat sink 11 (FIG. 2) and the electronic component 9 (FIG. 2).

In an alternative embodiment, the interior wall 200 of the bushing 180 includes threads that correspond to threads on the second wall 70 of the shoulder 40. As the threaded portion 35 is threadably rotated into the standoff 14, the bushing 180 engages, the top surface 12 of the heat sink 11. The bushing 180 is thus threadably retained along the shoulder 40.

Figure 4:
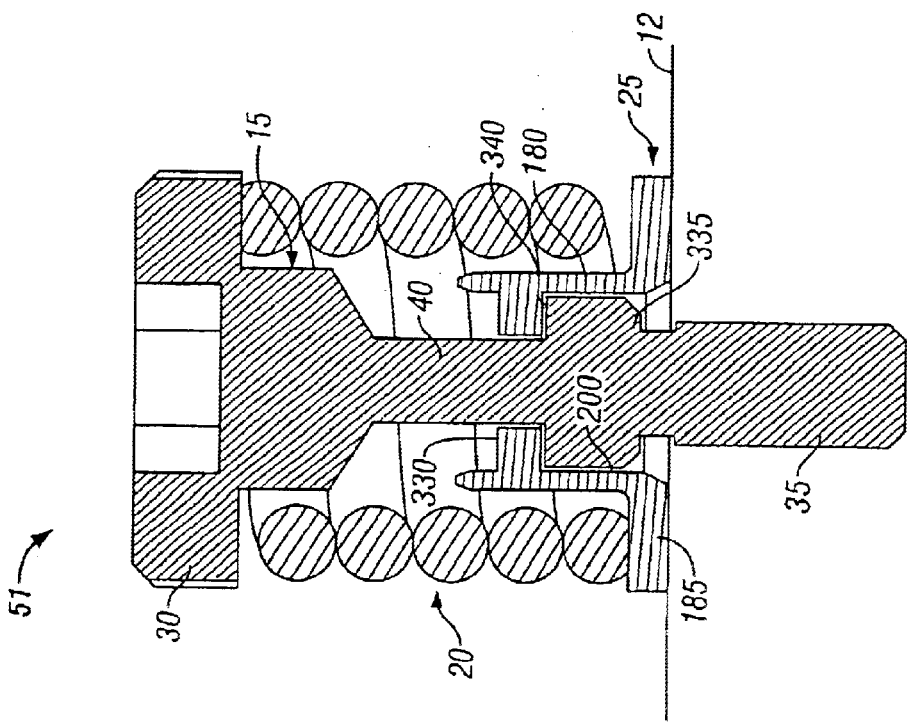
FIG. 4 illustrates a side sectional view of a load cell formed in accordance with an alternative embodiment of the present invention.

FIG. 4 illustrates a side sectional view of a load cell 51 formed in accordance with an alternative embodiment of the present invention. The bushing 180 includes a securing rib 330 that is formed integrally with, and extends radially inward from, the interior wall 200. The screw 15 includes a support collar 335 that is integrally formed with, and extends circumferentially outward from, the shoulder 40. The support collar 335 includes a ring-shaped top surface 340. Prior to rotatably inserting the screw 15 into the heat sink 11 (FIG. 2), the bushing 180 is retained along the shoulder 40 by the securing rib 330 engaging the top surface 340 of the support collar 335. Therefore, retention barbs are not required, and the spring 20 is partially compressed and retained between the head 30 and the washer 185. As the threaded portion 35 is rotatably inserted into the threaded aperture 16 (FIG. 2), the spring 20 pushes the spring retention member 25 downward so the securing rib 330 presses against the support collar 335 until the washer 185 engages, and is resisted by, the top surface 12 of the heat sink 11. As the top surface 12 resists the downward progress of the spring retention member 25, the spring 20 is further compressed, the threaded portion 35 rotatably proceeds further into the threaded aperture 16 (FIG. 2), and the support collar 335 proceeds downward away from the securing rib 330 while the spring 20 applies a controlled load along the load cell 10 to the heat sink 11 and the electronic component 9 (FIG. 2).

Figure 5:
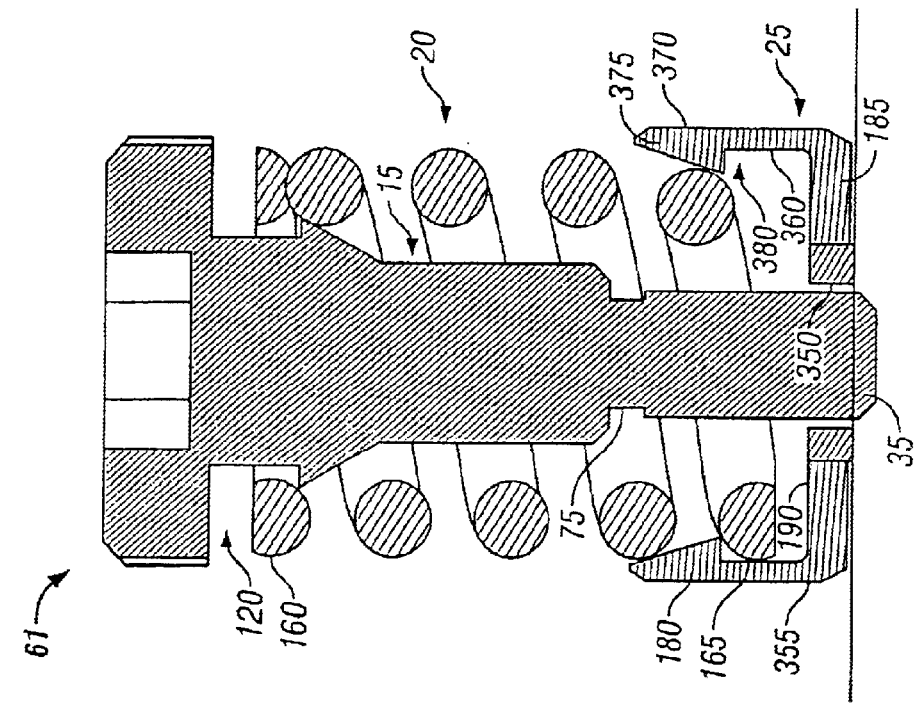
FIG. 5 illustrates a side sectional view of a load cell formed in accordance with an alternative embodiment of the present invention.

FIG. 5 illustrates a side sectional view of the load cell 61 formed in accordance with an alternative embodiment of the present invention. The washer 185 includes a circular inner wall 350 and a circular outer wall 355. The inner wall 350 receives and encircles the threaded portion 35. The bushing 180 is integrally formed with, and extends upward from, the outer wall 355 of the washer 185. The bushing 180 includes an interior wall 360 and a top end 370. The interior wall 360 includes a second triangular retention barb 375 that is formed integrally with, and extends radially inward from, the top end 370 of the bushing 180 toward the threaded portion 35. The second retention barb 375, the interior wall 360 of the bushing 180, and the top surface 190 of the washer 185 form a second retention gap 380. The spring 20 is suspended along the screw 15 with the top turn 160 of the spring 20 positioned within the first retention gap 120. The spring retention member 25 is suspended along the screw 15 by the spring 20 with the bottom turn 165 positioned in the second retention gap 380. In operation, the load cell 61 performs similarly to the load cell 10 described in FIGS. 1 and 3.

The load cell 10 of the various embodiments confers several benefits. First, the load cell 10 applies a more controlled load to the heat sink 11 and the electronic component 9 because the washer 185 has a small tolerance. A controlled tension load is necessary when attaching a heat sink 11 to an electronic component 9 because too little tension will result in a weak electrical connection between electric contacts situated within the electronic component 9, and too much tension will result in a ruptured electronic component 9. Secondly, because the washer 185 is already attached to the load cell 10, the washer 185 does not have to be separately aligned with the washer standoff 14 before inserting the screw 15 into the heat sink 11. Therefore, assembly time is reduced, and an operator may more easily insert the load cell 10 into threaded apertures 16 in the heat sink 11 that are surrounded by heat release fins 13 or other obstructions.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A load cell for interconnecting first to second structures with a desired amount of force, said load cell comprising:

a screw having a body with a threaded portion along a first end and a head at a second end opposed to said first end;

a spring received over said body, said spring having first and second ends opposite one another configured to exert a desired amount of force when compressed; and a spring retention member having an opening therethrough receiving said body of said screw, said spring retention member having a bushing secured to at least one of said spring and said body, said spring retention member having a washer extending outward from said bushing and a spring retention barb, said first and said second ends of said spring pressing against said washer and said head respectively.

2. The load cell of claim 1, wherein said bushing has a first end integrally formed with an inner diameter of said washer.

3. The load cell of claim 1, wherein said bushing has a first end and a second end with a rib extending about a perimeter of said second end.

4. The load cell of claim 1, wherein at least one end of said bushing is located between said spring and said screw.

5. The load cell of claim 1, wherein at least one end of said bushing includes means for frictionally engaging at least one of said spring and said body.

6. The load cell claim 1, wherein at least one end of said bushing includes a rib snapably engaging said first end of said spring.

7. The load cell of claim 1, wherein said screw further comprises a shoulder section, at least one end of said bushing includes a rib snapably engaging said shoulder section.

8. The load cell of claim 1, wherein said spring retention member is threadably joined to said threaded portion on said screw.

9. The load cell of claim 1, wherein said screw includes a barb configured to retain said second end of said spring.

10. The load cell of claim 1, wherein said spring retention member is freely slidable along said body of said screw when said spring is compressed and decompressed.

11. A load cell for threadably joining a heat sink to a second structure, said load cell comprising:

a screw having a body with a threaded portion along a first end and a head at a second end opposed to said first end;

a spring retention member having an opening therethrough receiving said body of said screw, said spring retention member having a bushing secured to at least one of said spring and said body, said spring retention member having a washer extending outward from said bushing and a spring retention barb, said first and second ends of said spring pressing against said washer and said head respectively; and a heat sink having a base and heat dissipating fins, said base including threaded openings therethrough wherein said threaded openings are configured to receive said screw and to secure said heat sink to a second structure.

12. The load cell of claim 11, wherein said bushing has a first end integrally formed with an inner diameter of said washer.

13. The load cell of claim 11, wherein said bushing has a first end and a second end with a rib extending about a perimeter of said second end.

14. The load cell of claim 11, wherein at least one end of said bushing is located between said spring and said screw.

15. The load cell of claim 11, wherein at least one end of said bushing includes a means for frictionally engaging at least one of said spring and said body.

16. The load cell of claim 11, wherein at least one end of said bushing includes a rib snapably engaging said first end of said spring.

17. A load cell for interconnecting first to second structures with a desired amount of force, said load cell comprising:

a screw having a body with a threaded portion along a first end and a head at a second end opposed to said first end;

a spirng received over said body, said spring having first and second ends opposite one another configured to exert a desired amount of force when compressed;

a washer having a center opening to receive said screw and having at least one face engaging said first end of said spring; and a retention means mounted to said washer for retaining said spring on said screw, said retention means including a spring retention barb extending from at least one of said spring and said body.

18. The load cell of claim 17, wherein said retention means includes a bushing joined to said washer wherein said bushing has a first end and a second end with a rib extending about a perimeter of said second end.

19. The load cell of claim 17, wherein said retention means includes a bushing joined to said washer wherein at least one end of said bushing is located between said spring and said screw.

20. The load cell of claim 17, wherein said retention means includes a bushing joined to said washer wherein at least one end of said bushing includes a rib snapably engaging said first end of said spring.

21. The load cell of claim 17, wherein said retention means is threadably joined to said threaded portions on said screw.

22. The load cell of claim 17, wherein said screw includes a barb configured to retain said second end of said spring.

23. A load cell for interconnecting first to second structures with a desired amount for force, said load cell comprising:

a screw having a body with a threaded portion along a first end and a head at a second end opposed to said first end;

a spring received over said body, said spring having first and second ends opposite one another configured to exert a desired amount of force when compressed; and a spring retention member having an opening therethrough receiving said body of said screw, said spring retention member having a bushing secured to at least one of said bushing and a spring retention barb, said first and said second ends of said spring pressing against said washer and said head respectively; wherein said bushing is located between said spring and said screw; wherein said spring retention member is freely slidable along said body of said screw when said spring is compressed and decompressed.

24. The load cell of claim 23, wherein said spring has a first diameter at said first end, a second diameter at said second end, and a third diameter equidistant between said first end and said second end, wherein third diameter is greater than said first diameter and said second diameter.

25. The load cell of claim 23, wherein at least one end of said bushing includes means for frictionally engaging at least one of said spring and said body.

26. The load cell of claim 23, wherein at least one end of said bushing includes a rib snapably engaging said first end of said spring.

27. The load cell of claim 23, wherein said screw further comprises a shoulder section, at least one end of said bushing includes a rib snapably engaging said shoulder section.

28. The load cell of claim 23, wherein said spring retention member is threadably joined to said threaded portion on said screw.

* * * * *